INVENTOR.
RICHARD E. WILLIAMS
JOHN S. GERIG

United States Patent Office 3,473,127
Patented Oct. 14, 1969

3,473,127
COVERT TRANSMITTER DETECTOR
Richard E. Williams, Fairfax, and John S. Gerig, McLean, Va., assignors to Scope Incorporated, Falls Church, Va., a corporation of New Hampshire
Filed Dec. 30, 1966, Ser. No. 606,456
Int. Cl. H04b 1/36
U.S. Cl. 325—364        9 Claims

ABSTRACT OF THE DISCLOSURE

A receiver for detecting the presence of a covert radio transmitter which operates by picking up any signal in the RF band and producing an audio alarm in response thereto.

---

This invention relates generally to a device for detecting the presence of a covert transmitter and more specifically to the use of an RF acoustic feedback loop for such detection.

One technique for detecting listening devices or "bugs" of the radiating type which has been in use for a number of years involves the practice of tuning a receiver through the entire RF spectrum and creating a regenerative loop when the target emitter falls within the passband of the receiver. Such a receiver is usually bulky, time consuming to use, and depends to a certain degree on the chance acoustical stimulation of the "bug" during the relatively short period of time that the receiver is tuned to the proper frequency. Additionally, this type of equipment requires the use of trained personnel. The presence of either the bulky equipment or the trained personnel gives the person using the listening device a warning so that he may deactivate the "bug" during the sweep operation through the use of a passive switch.

The practical application of the present invention involves a packaged device approximately the size of a cigarette package. Basically, the invention utilizes a broadband untuned RF amplifier which examines the entire spectrum of interest. All signals falling within this band are mixed with RF spikes created by a harmonic generator. Each spike represents an individual local oscillator so that intermediate frequencies are present across the entire band of interest. A slope detection technique passes the audio from all signals within the spectrum of interest to a narrow post detection filter. Thus, tuning of the receiver is avoided.

While this invention is directed primarily to detection, the setting of the gain control at which regeneration occurs gives an indication of the proximity of the listening device. The operational characteristics are such that when the device is in acoustical proximation of a radiating "bug," it will emit a warning tone and will then be turned off by the person carrying it.

The invention will be more fully understood from the following description taken in conjunction with the drawings wherein.

Figure 1:
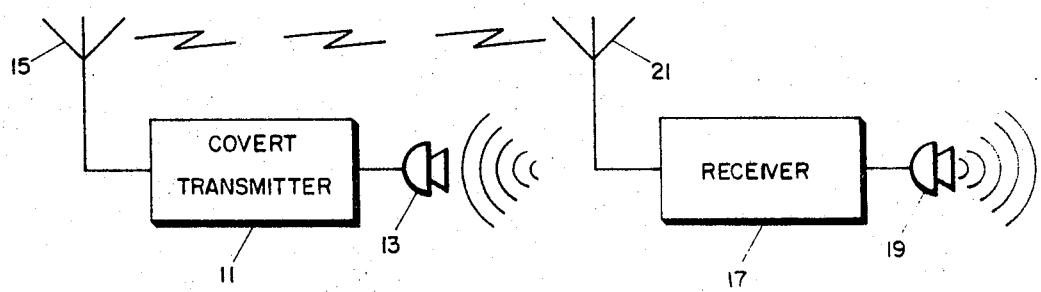
FIG. 1 is a schematic representation of the broad aspect of covert transmitter detection as used in the present invention.

Turning now more specifically to the drawings, there is shown in FIG. 1 a covert transmitter 11 connected to a microphone 13 concealed within a wall or the like. The output of transmitter 11 is fed to antenna 15 for propagation of the signal to a point removed from the microphone location.

The present invention is embodied in receiver 17 which is connected to an output speaker 19 and receives an input from antenna 21. Therefore, sound which is picked up by microphone 13 and transmitted by antenna 15 as RF energy, is received by antenna 21 and converted to an audio output by speaker 19. This provides the acoustic feedback loop.

Figure 2:
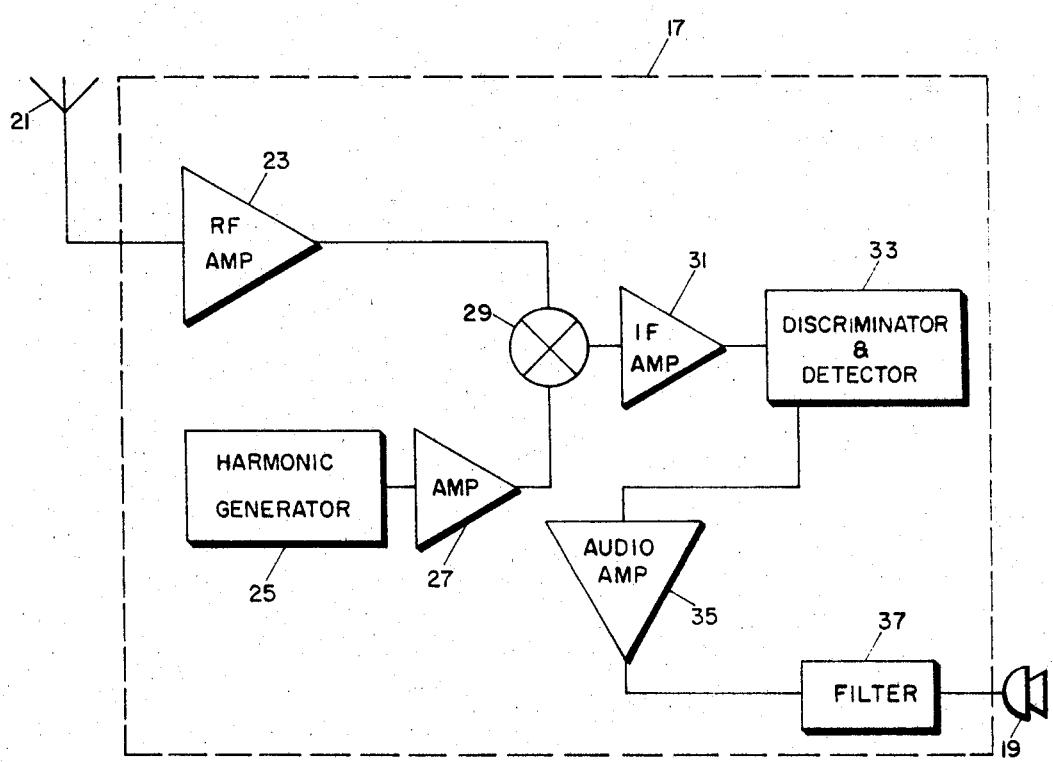
FIG. 2 is a schematic representation of a preferred embodiment of the invention.

A preferred embodiment of the invention is shown schematically in FIG. 2. The broadband untuned RF amplifier 23 receives the signal from antenna 21. This amplifier is designed so as to include the entire spectrum of interest. The output of amplifier 23 is fed to mixer 29 together with the output of a harmonic generator 25 as amplified by amplifier 27. Harmonic generator 25 produces a train of pulses equivalent to an array of harmonics so that beats at the intermediate frequency are present across the entire spectrum of interest.

Figure 3:
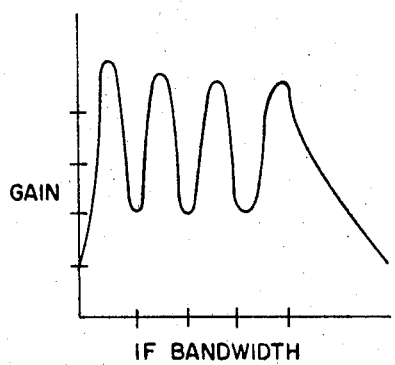
FIG. 3 is a graphic representation of the output of the IF amplifier of FIG. 2.
Figure 4:
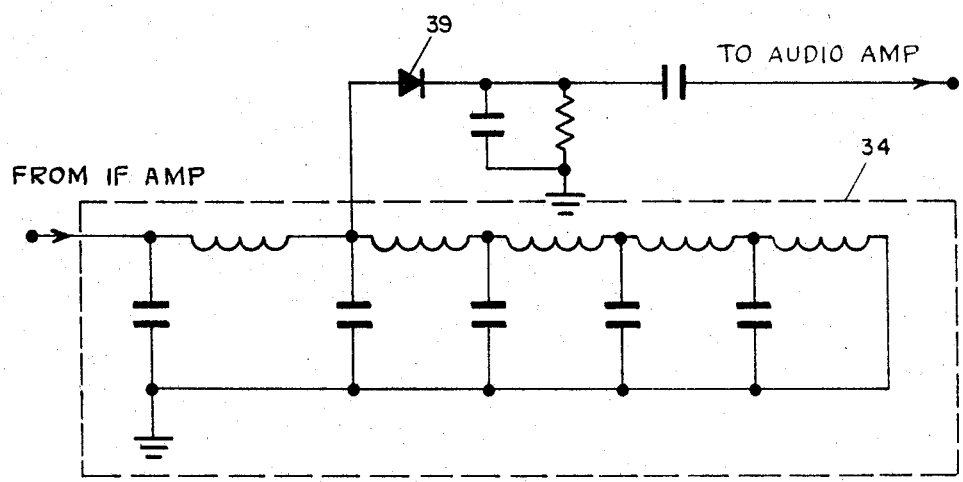
FIG. 4 is a circuit diagram of a preferred discriminator-detector used in the present invention.

The output of mixer 29 is fed to IF amplifier 31 which is terminated in a mismatched delay line 34 within the discriminator and detector 33, a preferred embodiment of which is shown in FIG. 4. This creates many peaks and valleys in the IF response curve as shown in FIG. 3.

Therefore, it can be seen that any signal falling within the IF bandpass will lie on a steep gain slope, and thus allow slope detection to take place for FM signals. Due to the fact that many listening devices have an FM output with no AM components, such detection is very important. Since no limiting is introduced, AM signals will also be detected in diode 39 (FIG. 4).

The output of discriminator and detector 33 is fed to an amplifier 35 for amplification of the audio from all signals within the spectrum of interest. The output of amplifier 35 is fed to a very narrow post-detection filter 37, such as a Helmholtz resonator, which reduces the system effective bandwidth to within practical limits and improves the signal-to-noise ratio to a point wherein only a nominal hiss is radiated from speaker 19. When the regenerative condition is satisfied, an audio tone at the post-detection filter frequency is sustained, and an audible alarm from speaker 19 indicates that a "bug" is present.

It is to be understood that the above description and accompanying drawings are illustrative only, since substitution of equivalent component parts within the system will now be obvious to those familiar with this art. Accordingly, the invention is to be limited only by the scope of the following claims.

We claim:
1. A receiver for detecting covert listening devices of the radiating type comprising
   an antenna,
   a broadband untuned RF amplifier coupled to said antenna, said amplifier being operative over a predetermined frequency spectrum,
   a harmonic generator for producing RF spikes,
   mixing means for combining the outputs of said amplifier and said harmonic generator,
   an IF amplifier coupled to the output of said mixing means,
   means coupled to the output of said IF amplifier for detecting both AM and FM signals,
   filter means coupled to said last named means for reducing the effective bandwidth of the audio output therefrom, and
   means coupled to said filter means for producing an audible alarm in response to a predetermined output from said filter means.
2. The receiver of claim 1 wherein said means coupled to said IF amplifier includes a mismatched delay line.

3. A receiver for detecting covert listening devices of the radiating type comprising
   an antenna,
   an untuned RF amplifier coupled to said antenna, said amplifier having a bandwidth sufficient to cover the entire frequency spectrum of interest,
   a harmonic generator,
   mixing means for combining the outputs of said amplifier and said harmonic generator so as to create intermediate frequencies across said bandwidth,
   means for amplifying said intermediate frequencies,
   slope detection means coupled to the output of said last named means, and
   narrow filter means coupled to the output of said slope detection means.

4. The receiver of claim 3 further comprising a mismatched delay line coupled between said means for amplifying said intermediate frequencies and said slope detection means.

5. The receiver of claim 3 wherein said narrow filter means is a Helmholtz resonator.

6. A receiver for detecting covert listening devices of the radiating type comprising
   an antenna,
   a harmonic generator for producing RF spikes,
   mixing means for combining the outputs of said antenna and said harmonic generator,
   IF amplifier means coupled to the output of said mixing means,
   means coupled to the output of said amplifier means for detecting the signal output therefrom,
   filter means coupled to said last named means for reducing the effective bandwidth of said signal output, and
   means coupled to said filter means for producing an indication in response to a predetermined output from said filter means.

7. The receiver of claim 6 wherein said means coupled to the output of said amplifier means detects amplitude modulated signals.

8. The receiver of claim 6 wherein said means coupled to the output of said amplifier means detects frequency modulated signals.

9. A receiver for detecting covert listening devices of the radiating type comprising
   an antenna,
   a harmonic generator,
   mixing means for combining the outputs of said antenna and said harmonic generator so as to create intermediate frequencies across a predetermined bandwidth,
   IF amplifier means coupled to the output of said mixing means,
   slope detection means coupled to the output of said first filter means, and
   narrow filter means coupled to the output of said slope detection means.

No references cited.

KATHLEEN H. CLAFFY, Primary Examiner

BARRY P. SMITH, Assistant Examiner

U.S. Cl. X.R.

340—224